UNITED STATES PATENT OFFICE.

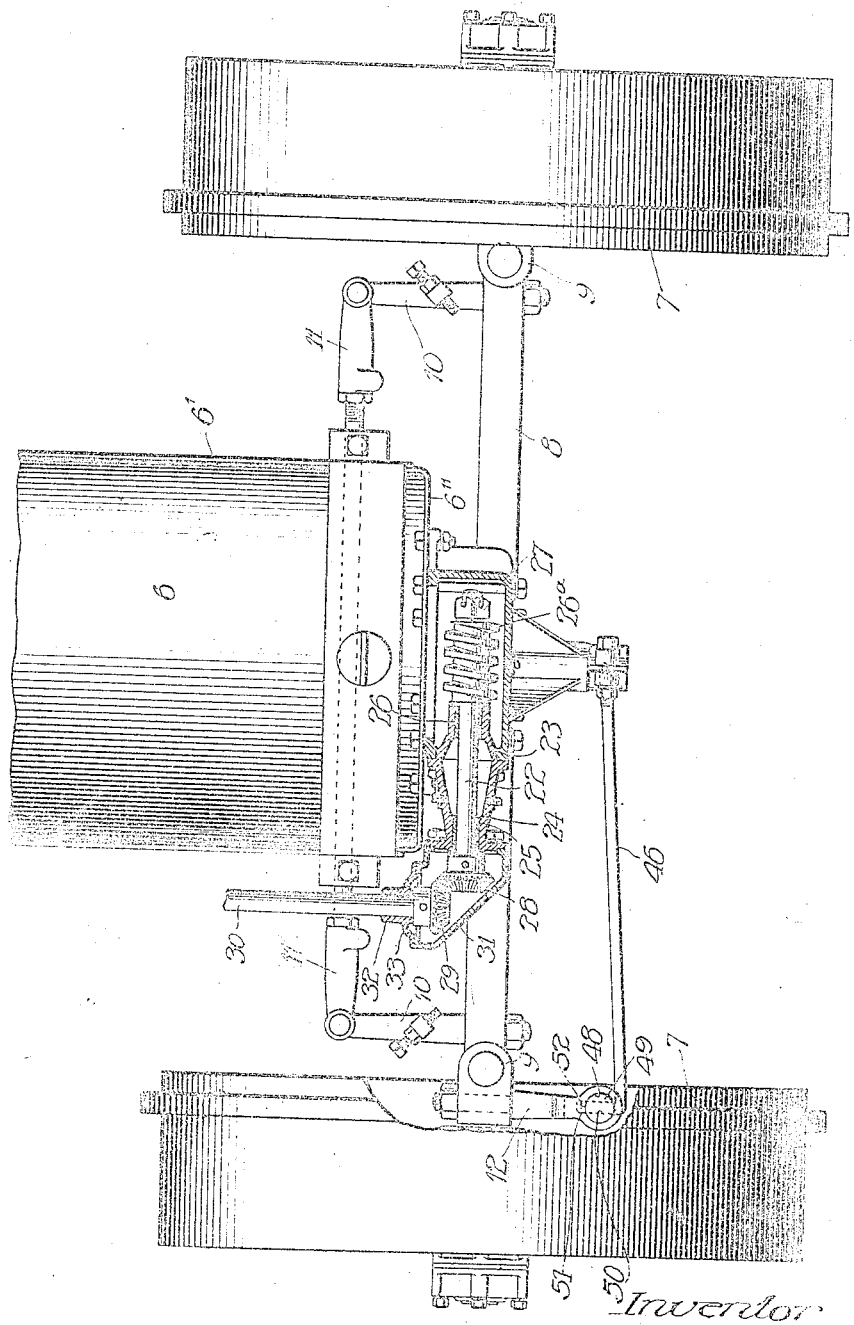

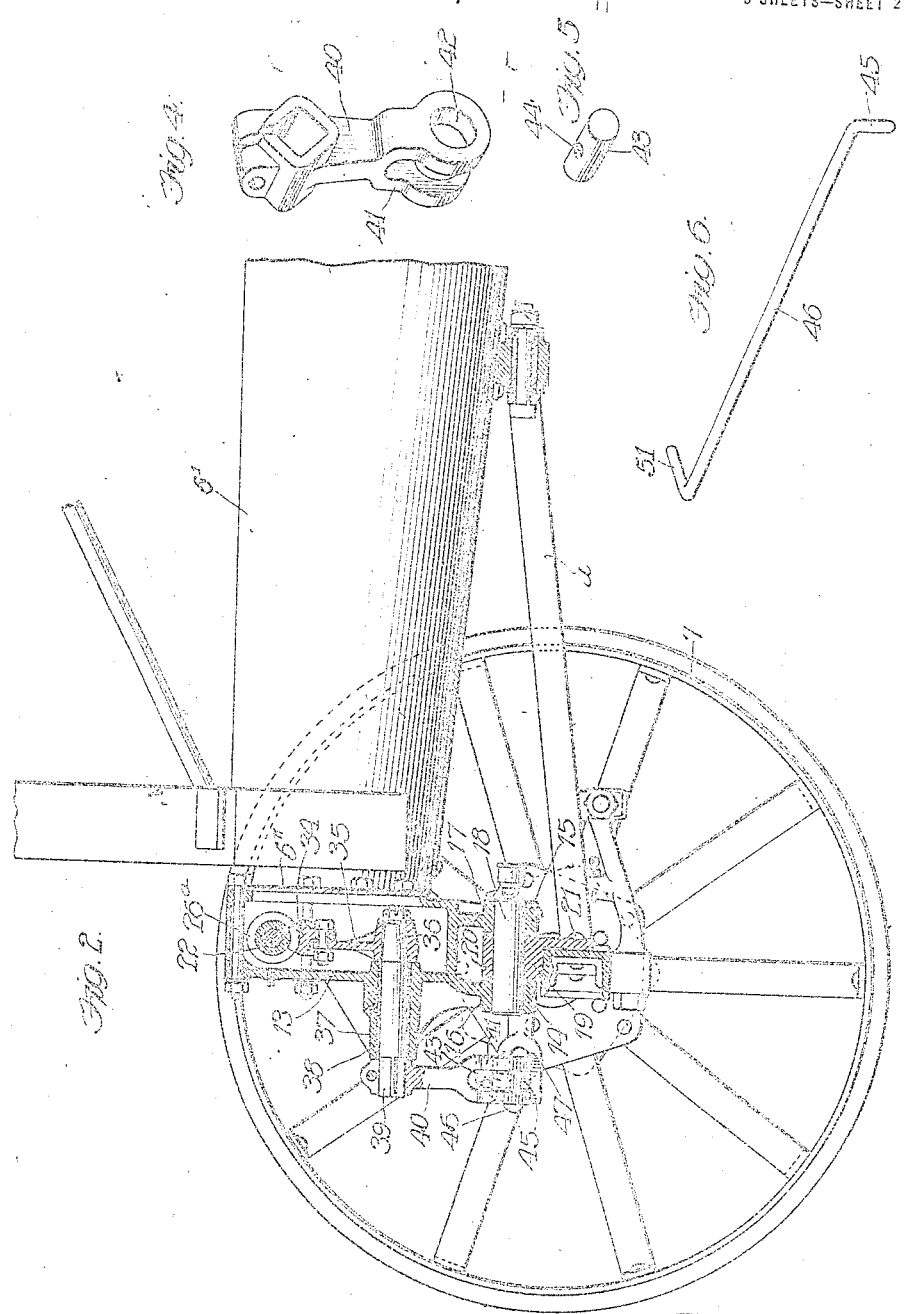

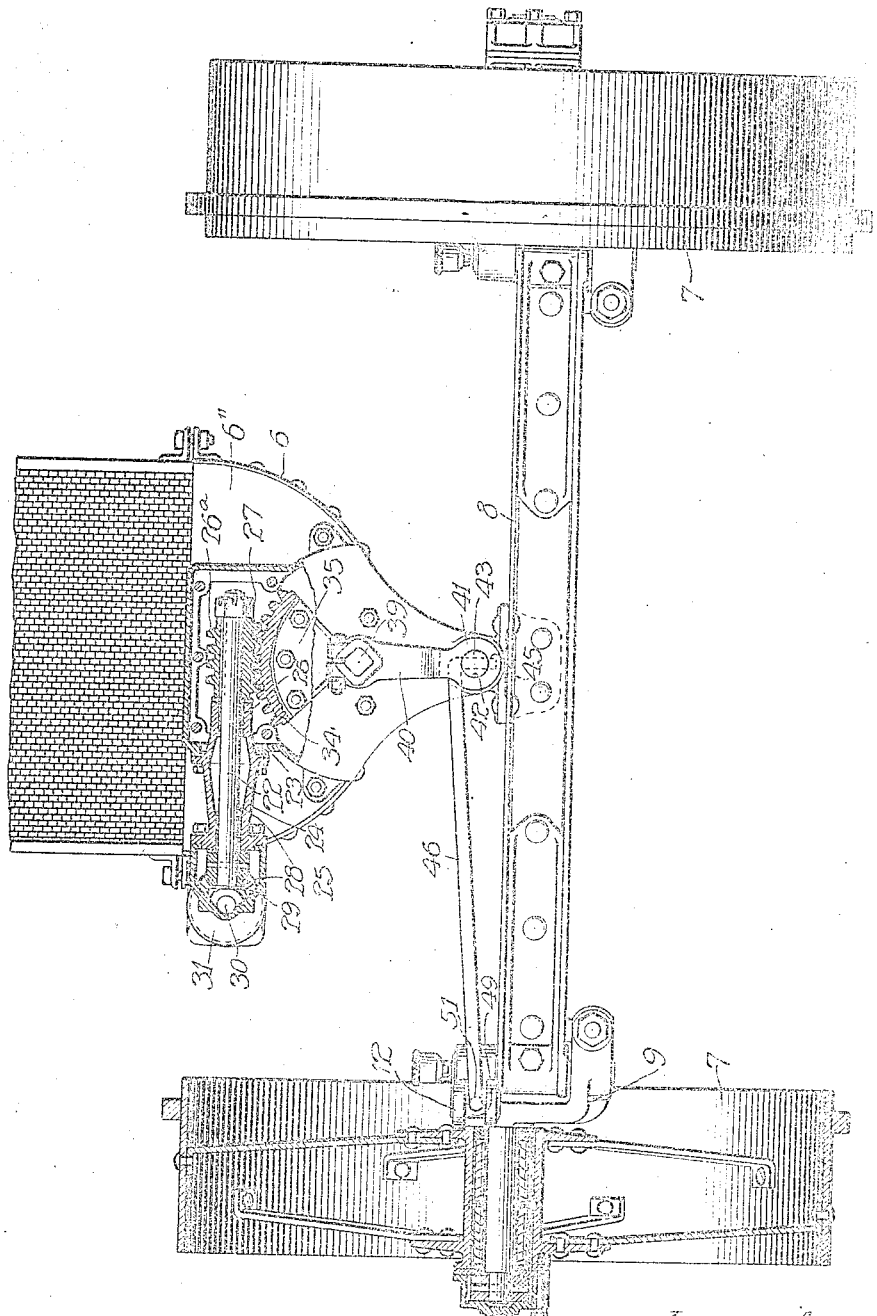

ROBERT O. HENDRICKSON, OF RACINE, WISCONSIN, ASSIGNOR TO J. I. CASE PLOW
WORKS COMPANY, OF RACINE, WISCONSIN, A CORPORATION OF DELAWARE.

GUIDING MECHANISM FOR TRACTORS.

1,379,762.　　　Specification of Letters Patent.　　Patented May 31, 1921.

Application filed May 14, 1920. Serial No. 381,267.

*To all whom it may concern:*

Be it known that I, ROBERT O. HENDRICKSON, a citizen of the United States, residing at Racine, county of Racine, and State of Wisconsin, have invented certain new and useful Improvements in Guiding Mechanism for Tractors, of which the following is a specification.

My invention is more particularly designed for use in connection with four wheel tractors and has for its object to produce a guiding mechanism of simple construction and easy manipulation and which will not be affected when the guiding wheels of the tractor are at different levels by reason of the unevenness of the ground traversed.

In the accompanying drawings forming part of the application, Figure 1 is a plan view partly in horizontal section of the front portion of a tractor showing my improved steering apparatus applied thereto; Fig. 2 a substantially central vertical section through the same, parts being shown in elevation; Fig. 3 a front view of the same partially in vertical section; and Figs. 4, 5 and 6 perspective views of details.

Each part is identified by the same reference character wherever it occurs in the several views.

My invention is illustrated in connection with a tractor having a body 6, wheels 7, front axle 8, and pivoted wheel journal members or knuckles 9 of known form with torsion rods *a* connecting the body and the front axle of known form. The arms 10 attached to the pivoted journal members or knuckles and the adjustable transverse rod 11 connecting them for movement together are also of common type and need not be further described. As usual one of the knuckles 9 is provided with a forwardly projecting arm 12 to which the steering mechanism hereinafter described is connected.

The tractor body comprises a shell 6′, the forward end of which is closed by a transverse plate 6″ and to the latter is bolted a housing 13 which contains a portion of the steering mechanism. A pair of lugs 14, 15 are cast integral with the housing at the lower end thereof, said lugs terminating in bosses 16, 17 which are bored to receive a pin 18 constituting the pivotal connection between the body of the tractor and the front axle 8. To complete the joint a bracket 19 formed with a correspondingly bored boss 20 is riveted or otherwise secured to the center of the axle by rivets 21 and the boss 19 extends between the bosses 16, 17 and receives the pin 18 by which the parts are pivoted together.

A transverse worm shaft 22 is mounted in the casting 13 which is formed with this in view with a lateral opening 23 in which is mounted a bearing member or sleeve 24, the opposite ends of which are supplied with bushings 25, 26 respectively in which the shaft 22 is journaled. Beyond the inner bushing the shaft 22 is formed or provided with a worm $26^a$ which in the present instance is splined on said shaft and secured in place by nut 27. At its other end shaft 22 is provided with a beveled gear 28 which meshes with a similar pinion 29 on a shaft 30 which extends to the rear of the machine and is provided as usual with a steering wheel. The beveled pinions 28, 29 are inclosed in a casting 31 bolted to the sleeve 24 and shaft 30 is journaled at its forward end in a boss 32 on a cap plate 33 closing an opening in the last said housing. Worm 26 engages a worm sector 34 which is bolted to a sector plate 35 splined upon the inner end of a shaft 36 within the main housing 13. Shaft 36 is journaled in an elongated boss 37 projecting from the front of the housing 13 and provided with a suitable bushing 38. The forward end of the shaft 36 is squared as at 39 to receive an arm 40 and the latter is clamped upon said shaft at its upper end and forked at its lower end as at 41, the tines or branches of the fork being perforated in register as at 42 to receive a pivot pin 43. Pivot pin 43 is transversely perforated at 44 to receive the downwardly turned end 45 of a link rod 46 by which the hanging arm 40 is connected to the steering arm 12 to which reference has been made. To provide a universal joint between arm 12 and link rod 46 the arm 12 is bifurcated at 47, the upper and lower members of the fork being perforated in register as at 48 to receive a vertical pivot pin 49, and said pin is horizontally perforated at 50 to receive the laterally bent end 51 of the link rod 46. The end of the link rod may be held in the vertical pin 49 by a pin 52.

It is to be particularly noted that the pin 43 in the lower end of the hanging arm 40 is substantially coaxial with the pivot 18 between the front axle and the housing 13 and it follows from this feature of the construction that the tilting of the axle relative to the body of the tractor has no effect on the steering of the machine.

I claim:

1. In a steering mechanism for tractors and the like, a front axle, a body pivoted thereto upon a horizontal axis, front wheels, knuckles on which the front wheels are journaled, pivoted on vertical axes to the respective ends of the front axle, connections between the knuckles for securing common movement thereof, an arm projecting from one of said knuckles, a longitudinally extending shaft mounted directly above and in the plane of the pivot between the front axle and the body portion of the tractor, an arm on said shaft, a horizontal pin journaled in said arm and substantially in the line of the pivot pin between the axle and the body, a link connecting said pin and the forwardly projecting arm on the knuckle, and means for oscillating said shaft.

2. In a steering mechanism for tractors and the like, a front axle, a body pivoted thereto upon a horizontal axis, wheels, knuckles on which the front wheels are journaled, pivoted on vertical axes to the respective ends of the front axle, connections between the knuckles for securing common movement thereof, an arm projecting forwardly from one of said knuckles, a longitudinally extending shaft mounted directly above and in the plane of the pivot between the front axle and the body portion of the tractor, a depending arm on said shaft, said arm being bifurcated at its lower end, a horizontal pin journaled in the bifurcated end of said arm, substantially in the line of the pivot pin between the axle and the body, a link rod having a downwardly turned end pivoted in said pivot pin in the arm and connecting said pin and the forwardly projecting arm on the knuckle and means for oscillating said shaft.

3. In a steering mechanism for tractors and the like, a front axle, a body, a housing secured to the front end of the body, depending lugs on the housing, a bracket on the axle, a pivot pin received in openings in said lugs and bracket, and forming a pivot between said axle and body, a shaft journaled in said housing above the pivot pin, a sector on said shaft in the housing, a transverse worm shaft, the worm of which engages said sector, means for rotating the worm shaft, an arm depending from the first mentioned shaft, front wheels, knuckles on which the front wheels are journaled, pivoted on vertical axes to the respective ends of the front axle, connections between the knuckles for securing common movement thereof, an arm projecting forwardly from one of said knuckles, and a link rod connecting said arms.

ROBERT O. HENDRICKSON.